(12) United States Patent
Gilbert et al.

(10) Patent No.: US 10,857,774 B2
(45) Date of Patent: Dec. 8, 2020

(54) TRANSFERRING GRAPHITIC THIN FILMS WITH A LIQUID GALLIUM PROBE

(71) Applicant: VAON, LLC, Bowling Green, KY (US)

(72) Inventors: John Gilbert, Bowling Green, KY (US); Henry Steen, Bowling Green, KY (US); Keith Andrew, Bowling Green, KY (US); Richard C Pape, Bowling Green, KY (US)

(73) Assignee: VAON, LLC, Bowling Green, KY (US)

( * ) Notice: Subject to any disclaimer, the term of this patent is extended or adjusted under 35 U.S.C. 154(b) by 43 days.

(21) Appl. No.: 16/196,187

(22) Filed: Nov. 20, 2018

(65) Prior Publication Data

US 2019/0152211 A1    May 23, 2019

Related U.S. Application Data

(60) Provisional application No. 62/588,994, filed on Nov. 21, 2017.

(51) Int. Cl.
| | | |
|---|---|---|
| *B32B 37/00* | (2006.01) | |
| *B32B 38/10* | (2006.01) | |
| *C23F 1/08* | (2006.01) | |
| *B32B 9/00* | (2006.01) | |
| *B32B 37/24* | (2006.01) | |
| *C23F 1/18* | (2006.01) | |

(52) U.S. Cl.
CPC ............ *B32B 37/025* (2013.01); *B32B 9/007* (2013.01); *B32B 37/24* (2013.01); *B32B 38/10* (2013.01); *C23F 1/08* (2013.01); *C23F 1/18* (2013.01); *B32B 2037/243* (2013.01); *B32B 2264/108* (2013.01)

(58) Field of Classification Search
CPC ... B01D 45/04; C23F 1/08; C23F 1/18; B32B 2037/243; B32B 2264/108; B32B 37/025; B32B 37/24; B32B 38/10; B32B 9/007; F02C 3/04; F02C 7/047; F02C 7/052; B64D 2033/0246; B64D 33/02; B03C 3/0175; B03C 3/145; F05D 2220/32; F05D 2240/35; F05D 2300/507
See application file for complete search history.

(56) References Cited

U.S. PATENT DOCUMENTS

| | | | | |
|---|---|---|---|---|
| 2012/0082737 | A1* | 4/2012 | Florence | .............. A61K 36/185 424/725 |
| 2013/0272951 | A1* | 10/2013 | Hiura | ..................... B82Y 30/00 423/448 |

FOREIGN PATENT DOCUMENTS

CN    107808819 A    *  3/2018

OTHER PUBLICATIONS

Translation of CN107808819.*
"Graphitization at interface between amorphous carbon and liquid gallium for fabricating large area graphene sheets" Journal of Vacuum Science & Technology B: Microelectronics and Nanometer Structures Processing, Measurement, and Phenomena 27, 3063 (2009).*

* cited by examiner

*Primary Examiner* — Sonya M Sengupta
(74) *Attorney, Agent, or Firm* — 21st Century IP LLC; Kelly Hollowell

(57) ABSTRACT

The present invention generally relates to a process for transferring a graphitic thin film and a kit for the same.

14 Claims, 5 Drawing Sheets

TRANSFERRING GRAPHITIC THIN FILMS WITH A LIQUID GALLIUM PROBE

FIELD OF THE INVENTION

The present invention generally relates to a process for transferring a graphitic thin film and a kit for the same.

BACKGROUND OF THE INVENTION

The transfer of graphitic thin films from one surface to another is hindered by one or more of the following: 1) the films are brittle, being typically from one to ten atoms thick; 2) graphitic thin films are difficult to locate with the unaided eye, being nearly completely transparent to white light; and, 3) current transfer methods involve the application of polymers such as polymethyl methacrylate (PMMA) or polyethylene terephthalate (PET), contaminating the film.

In view of the above, it would be advantageous to discover new ways of transferring graphitic thin films.

SUMMARY OF THE INVENTION

In an aspect, the present invention provides a novel method of transferring a graphitic thin film.

In another aspect, the present invention provides a novel kit for transferring a graphitic thin film.

These and other aspects, which will become apparent during the following detailed description, have been achieved by the inventors' discovery that liquid gallium can be used to transfer a graphitic thin film.

DETAILED DESCRIPTION OF THE PREFERRED ASPECTS

Figure 1:
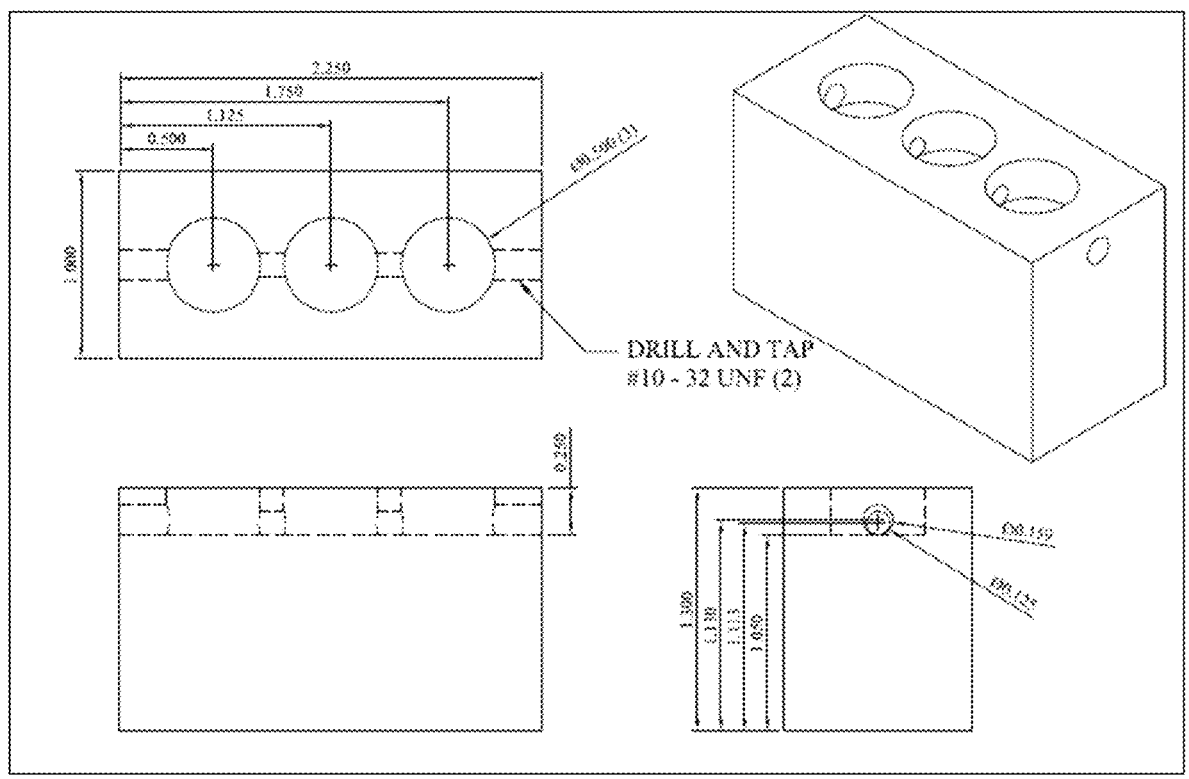
FIG. 1 is a drawing of a three-chamber etching container useful in the present invention.

FIG. 1 shows a drawing of a three-chamber etching container useful in the present invention, wherein the chambers are interconnected by a tube (or ports) (dimensions are in inches). The exterior openings of the tubes (or ports) are tapped to receive threaded plugs during the etching process. A variant having a height of approximately 0.5" was used for the experiment described in the Examples.

Figure 2:
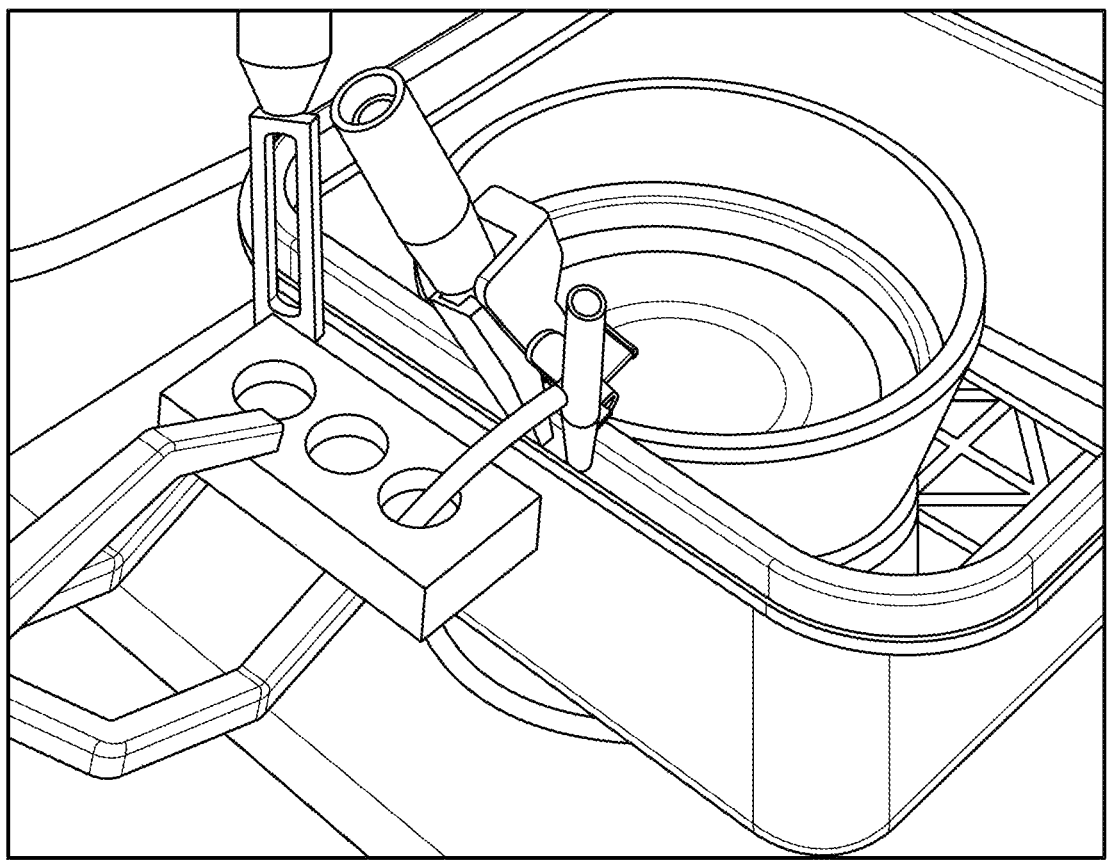
FIG. 2 is a photograph of a three-chamber etching container.

FIG. 2 is a photograph of a three-chamber etching container (shown with threaded plugs in place and made transparent to illustrate the interconnecting tube and fluid levels), with the bottom of its concave meniscus set level to that of the convex meniscus of the regulator container. The etching container is connected to a fluid level regulation container via a siphon tube (orange). A titration column is suspended above the opposite chamber.

Figure 3:
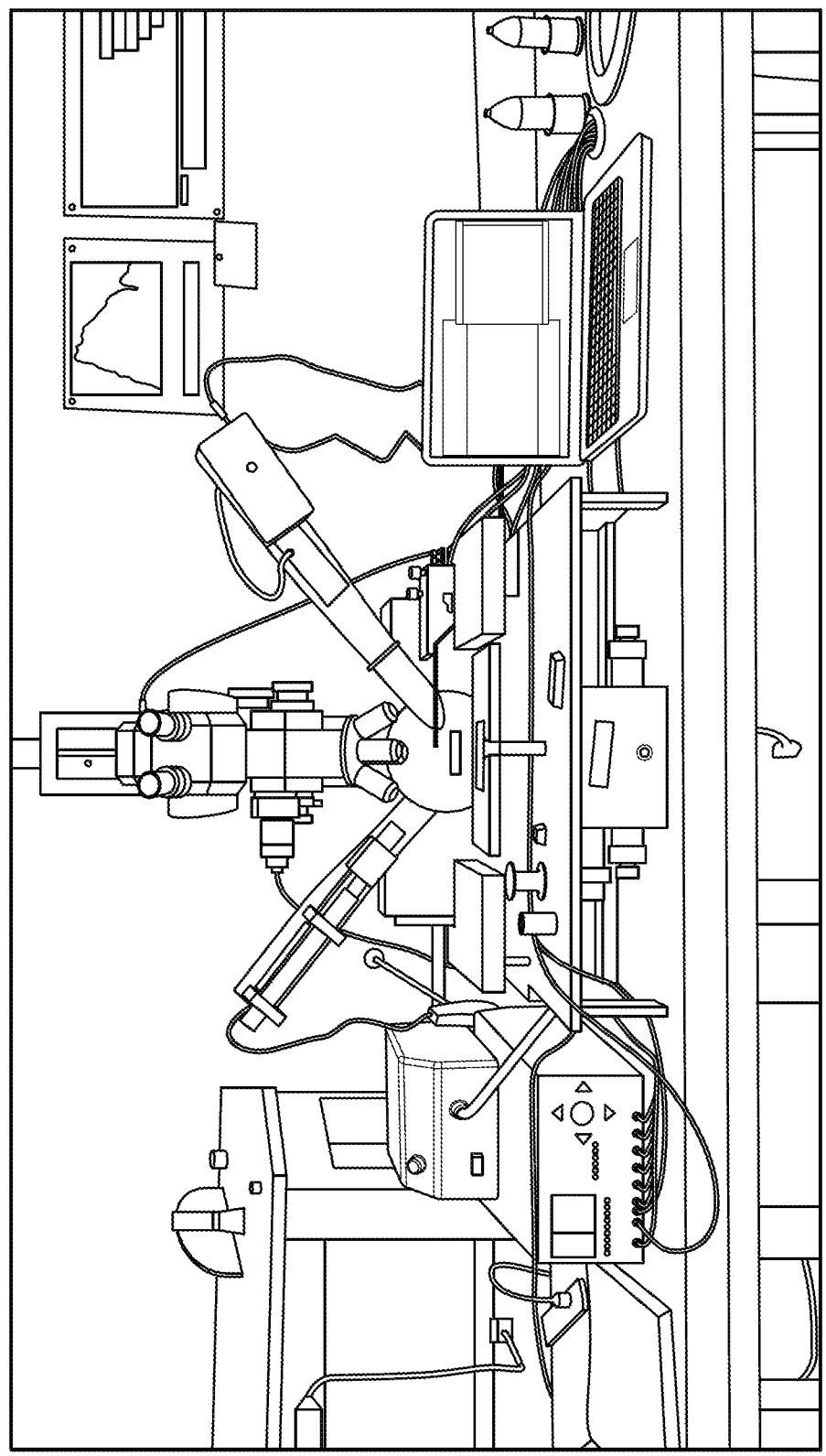
FIG. 3 is a photograph of a Brewster's angle microscope with etching container.

FIG. 3 is a photograph of a Brewster's angle microscope with etching container (black, center of frame) in place on the stage and under the gallium probe (red, center of frame).

Figure 4:
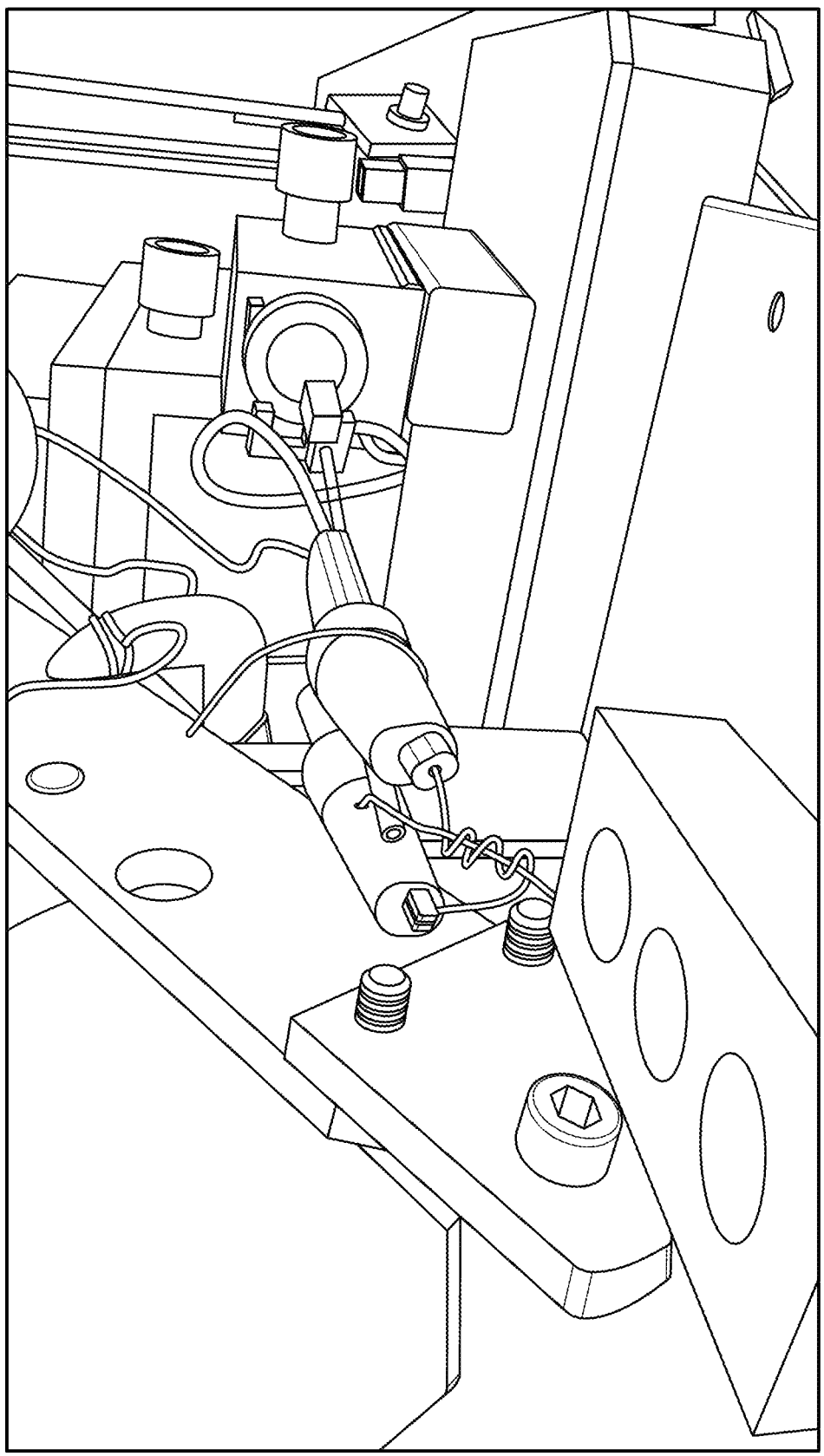
FIG. 4 is a photograph of a gallium probe on the end of a micromanipulator.

FIG. 4 is a photograph of a gallium probe on the end of a micromanipulator. The gallium probe has a gallium drop suspended by a wire loop under a resistance wire heating coil.

Figure 5:
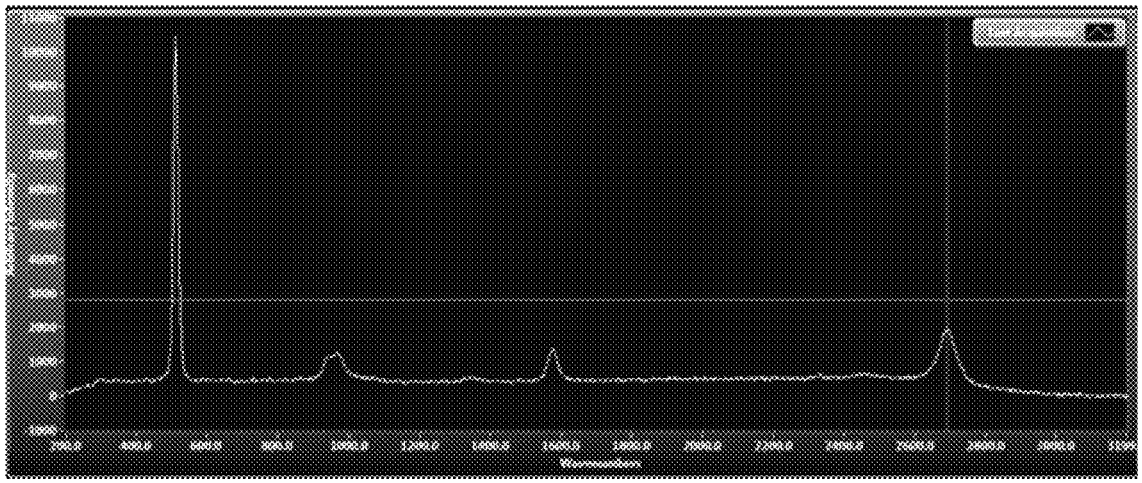
FIG. 5 shows before and after Raman spectra.
Figure 5:
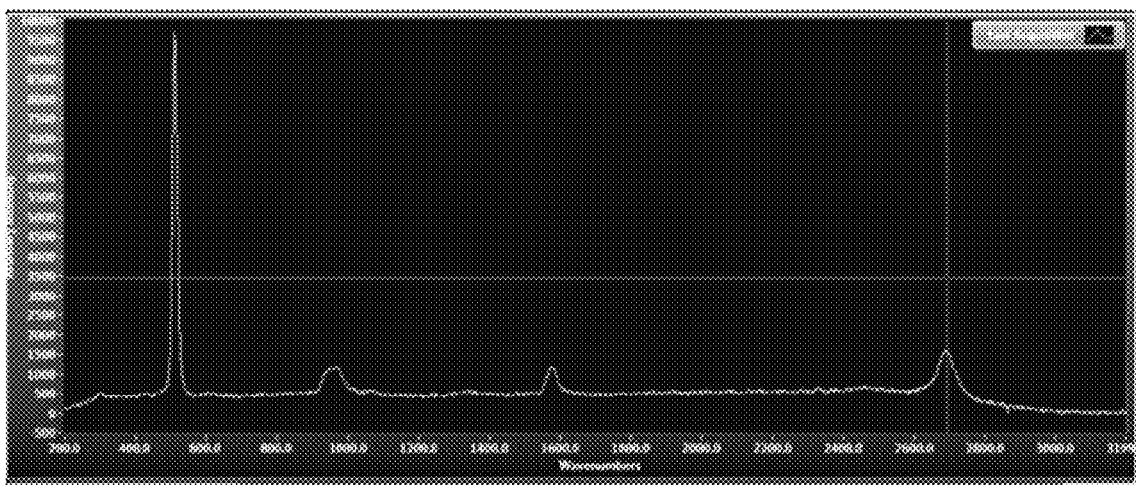

FIG. 5 shows Raman spectra before (top) and after (bottom) contact with the gallium probe of the present invention. The spectra show $Si/SiO_2$ peaks at 511 $cm^{-1}$ and 965 $cm^{-1}$, and graphitic layer peak shifts of 1343 $cm^{-1}$ to 1349 $cm^{-1}$ (D peak), 1574 $cm^{-1}$ to 1577 $cm^{-1}$ (G peak), and 2691 $cm^{-1}$ to 2689 $cm^{-1}$ (2D peak), respectively.

In an aspect, the present invention provides a novel method of transferring a graphitic thin film, comprising:
  (a) contacting a liquid-suspended graphitic thin film with a liquid gallium probe, wherein the graphitic thin film adheres to the liquid gallium of the probe to form a gallium-suspended graphitic thin film; and,
  (b) transferring the graphitic thin film to a substrate by contacting the graphitic thin film with the substrate, wherein the graphitic thin film adheres to the substrate to form a graphitic thin film-coated substrate.

Graphitic thin film is a layer of material, primarily comprising: graphene (a crystalline allotrope of carbon typically of a single atomic plane of graphite having a 2-dimensional hexagonal lattice structure of carbon atoms). The film is typically from 1, 2, 3, 4, 5, 6, 7, 8, 9, to 10 atomic layers in thickness.

In another aspect, the graphitic thin film is suspended in water. In another aspect, the water is deionized water.

In another aspect, the substrate of step (b) is an oxidized Si wafer. For example, the wafer can be an 800 μm thick wafer.

In another aspect, contacting step (a) and transferring step (b) are performed by using a micromanipulator to maneuver the probe to the graphitic thin film and then the gallium-suspended graphitic thin film to the substrate.

In another aspect, the liquid gallium probe, comprises:
  (i) a shank with $1^{st}$ and $2^{nd}$ ends;
  (ii) a loop attached to the $1^{st}$ end of the shank;
  (iii) a drop of gallium in contact with the loop; and
  (iv) a heat source capable of liquefying gallium.

The shank of the probe is made of a material (or materials) that does not readily alloy or react with gallium. In another aspect, the shank is tungsten. The dimensions of the shank are determined by the dimensions of the etching chamber. As an example, the shank can vary from a hair-like thickness to 18 gage wire.

At the $1^{st}$ end of the shank is a loop, which is also made of a material (or materials) that does not readily alloy or react with gallium. In another aspect, the loop is tungsten. In another aspect, the loop itself is about 1 mm in diameter. The thickness of the loop is similar to that of the shank. As an example, the loop can vary from a hair-like thickness to 18 gage wire.

The drop of gallium is typically of a size sufficient to adhere both to the loop and to the graphitic layer being transferred. In another aspect, the drop is about 0.25 $mm^3$. In another aspect, the drop of gallium is suspended from the loop in an inverted cone shape. The drop of gallium used in the transferring process is in a liquid form. This form is still dense enough to "stick" to the loop of the probe, but liquid enough to be able to adhere to the graphitic thin film. In another aspect, the drop of gallium is heated to slightly above its melting point (about 30.5° C.) prior to contacting with the graphitic thin film.

In another aspect, the heat source, comprises: a coil (or a plurality of coils) of resistance wire surrounding, but not touching the shank and in close enough proximity to the gallium drop (but not touching it) to liquefy it. Typically the resistance wire leads (the two ends of the coil) are connected to a power supply (e.g., 0.5 V at 2 A DC). In another aspect, the resistance wire is a nickel chromium wire. In another aspect, the thickness of the resistance wire is about 20, 22, to 24 gage.

In another aspect, the process, prior to step (a), further comprises:
  (a1) placing a graphitic-metal material, comprising: the graphitic thin film and a metal layer, into a $1^{st}$ chamber of an etching container, comprising:
    (i) a $1^{st}$ chamber comprising: an etchant solution, a $1^{st}$ port, and a $2^{nd}$ port, wherein the etchant level is above the level of the ports and is in contact with the metal layer of the graphitic-metal material;
    (ii) a $2^{nd}$ chamber adjacent to the $1^{st}$ chamber, comprising: the etchant solution and a $1^{st}$ port in liquid contact with the $1^{st}$ port of the $1^{st}$ chamber, wherein the etchant level is above the level of the $1^{st}$ port; and,
    (iii) a $3^{rd}$ chamber adjacent to the $1^{st}$ chamber, comprising: the etchant solution and a $1^{st}$ port in liquid contact with the $2^{nd}$ port of the $1^{st}$ chamber, wherein the etchant level is above the level of the $1^{st}$ port;
  (a2) inserting, after the etchant has dissolved the metal layer of the graphitic-metal sample, a first end of a siphon below the etchant level of the $2^{nd}$ chamber and the second end into a water-containing fluid level regulation container,
  (a3) introducing water into the $3^{rd}$ chamber at a rate and amount sufficient to replace the etchant in the $1^{st}$ chamber with water by causing;
    (i) the etchant solution to exit the $3^{rd}$ chamber and enter the $1^{st}$ chamber;
    (ii) the etchant solution to exit the $1^{st}$ chamber and enter the $2^{nd}$ chamber; and,
    (iii) the etchant solution to exit the $2^{nd}$ chamber and into the fluid level regulation chamber via the siphon.

Water is introduced into the $3^{rd}$ chamber at a rate that will cause the etchant solution to flow into the $1^{st}$ chamber and etchant solution to flow from the $1^{st}$ chamber into the $2^{nd}$ chamber, and finally etchant solution to flow from the $2^{nd}$ chamber into the fluid regulation chamber. The rate is such that the floating graphitic thin film in the $1^{st}$ chamber is left substantially undisturbed. As additional water is added the fluid flowing will change from etchant to a mixture of etchant and water and finally just water. Once the fluid of the $1^{st}$ chamber is water or substantially water, the introduction of water to the $3^{rd}$ chamber can be discontinued.

In another aspect, the process, further comprises:
  (a4) locating the resulting graphitic thin film with a Brewster's Angle Microscope.

In another aspect, the process, prior to step (a), further comprises:
  (a5) heating the gallium to a temperature sufficient to liquefy it.

The fluid regulation container is filled with water having its surface level with that of the etchant in the etching container, as well as level with its own edge or spout. This allows excess water to spill off into a basin and the container to act as a fluid level regulator.

Liquid contact in the etching container means that a liquid can flow between the chambers that are in contact. For example, etchant can flow from the $1^{st}$ chamber into the $2^{nd}$ due to the liquid contact of the $1^{st}$ port in each.

The ports in the chambers are typically located opposite one another (when two are present). The ports in the chambers are typically are at the same level as one another and the other ports in the container and are near the bottom of their respective chambers. The ports form a channel between the chambers, near the bottom of the chambers and below the fluid level.

In another aspect, "adjacent to" means that the chambers (e.g., $1^{st}$ and $2^{nd}$) partially share a common wall or boundary. For example, when the chambers are cylindrical, part of the $1^{st}$ and $2^{nd}$ chambers (and $1^{st}$ and $3^{rd}$) are touching or share a common portion of their respective cylinders (e.g., see FIG. 1).

In another aspect, one or both of the $2^{nd}$ and $3^{rd}$ chambers have an external port. In another aspect, the external port(s) of the etching container is tapped. In another aspect, the etching container, further comprises: a plug (or plugs) threaded into the external port(s).

In another aspect, the $1^{st}$, $2^{nd}$, and $3^{rd}$ chambers are cylindrical with open tops (e.g., tops that are exposed to the atmosphere).

In another aspect, the $1^{st}$, $2^{nd}$, and $3^{rd}$, chambers are all housed in one structure. In this aspect, the ports of the $1^{st}$ and $2^{nd}$ chambers ($1^{st}$ and $1^{st}$ ports) and the $1^{st}$ and $3^{rd}$ chambers ($2^{nd}$ and $1^{st}$ ports, respectively) are connected (i.e., form a channel between their respective chambers). In another aspect, the etching container is a rectangular container. In another aspect, the etching container is a rectangular container and the $1^{st}$, $2^{nd}$, and $3^{rd}$ chambers are cylindrical and are linearly disposed in the container.

The metal layer is typically the metal on which the graphitic thin film was formed. In another aspect, the metal layer of step (a1) is copper. In another aspect, the metal layer is a copper-nickel alloy.

The etchant is a liquid capable of fully dissolving the metal layer (e.g., copper) but not negatively affecting the graphitic thin film. In another aspect, the etchant solution of step (a1)(i) is 1M ferric chloride.

The water can be introduced to the $3^{rd}$ chamber using a flow control device (e.g., an eye dropper or titration column). Typically deionized water is used.

In another aspect, the present invention provides a novel kit for transferring a graphitic thin film, comprising:
  (a) a gallium probe, comprising:
    (i) a shank with $1^{st}$ and $2^{nd}$ ends;
    (ii) a loop attached to the $1^{st}$ end of the shank;
    (iii) a drop of gallium in contact with the loop; and,
    (iv) a heat source capable of liquefying gallium; and,
  (b) an etching container, comprising:
    (i) a $1^{st}$ chamber comprising: a $1^{st}$ port and a $2^{nd}$ port;
    (ii) a $2^{nd}$ chamber adjacent to the $1^{st}$ chamber, comprising: a $1^{st}$ port in liquid contact with the $1^{st}$ port of the $1^{st}$ chamber; and,
    (iii) a $3^{rd}$ chamber adjacent to the $1^{st}$ chamber, comprising: a $1^{st}$ port in liquid contact with the $2^{nd}$ port of the $1^{st}$ chamber.

In another aspect, the present invention provides a novel kit for transferring a graphitic thin film, comprising:
  (a) a gallium probe, comprising:
    (i) a shank with $1^{st}$ and $2^{nd}$ ends;
    (ii) a loop attached to the $1^{st}$ end of the shank;
    (iii) a drop of gallium in contact with the loop; and,
    (iv) a heat source capable of liquefying gallium; and,
  (b) an etching container, comprising:
    (i) a $1^{st}$ chamber comprising: an etchant solution, a $1^{st}$ port, and a $2^{nd}$ port, wherein the etchant level is above the level of the ports and is in contact with the metal layer of the graphitic-metal material;

(ii) a $2^{nd}$ chamber adjacent to the $1^{st}$ chamber, comprising: the etchant solution and a $1^{st}$ port in liquid contact with the $1^{st}$ port of the $1^{st}$ chamber, wherein the etchant level is above the level of the $1^{st}$ port; and, (iii) a $3^{rd}$ chamber adjacent to the $1^{st}$ chamber, comprising: the etchant solution and a $1^{st}$ port in liquid contact with the $2^{nd}$ port of the $1^{st}$ chamber, wherein the etchant level is above the level of the $1^{st}$ port.

In another aspect, the kit, further comprises:

(c) a micromanipulator.

The micromanipulator typically attaches to the $2^{nd}$ end of the shank and allows the operator to selectively move the probe in order to contact the graphitic thin film when it is floating in the etching container (e.g., after location with a Brewster's Angle Microscope) and then contact the gallium-suspended graphitic thin film with the substrate (e.g., oxidized Si wafer).

The method of transfer of the present invention is expected to be useful in the construction of small components that require the precise placement of submillimeter thin films, to include small graphene flakes and crystal domains, or other delicate 2D structures, without damage or supportive layer residue contamination.

EXAMPLES

The following examples are meant to illustrate, not limit, the present invention.

Example 1: General Procedure

A small piece of a metallic substrate bearing a graphitic sample of approximately 1 mm$^2$ or less is cut-out (e.g. punched) of a larger piece to form a sample-bearing substrate. The sample-bearing substrate is placed in the center chamber (the etching chamber or $1^{st}$ chamber) of a three-chambered etching container (see FIG. 1) that has been filled with 1M ferric chloride (or comparable etchant), metallic side down (the graphitic sample being on top), so that it floats on the etchant bath and is confined to the center of the chamber by the concave meniscus in the fluid.

The metallic substrate is allowed to dissolve, leaving the graphitic thin film floating on the surface of the etchant bath. The etching times will vary depending on substrate thickness, substrate composition, and etchant used. After dissolution of the metallic substrate, a small siphon tube, primed with water, is introduced into one of the remaining two outer chambers ($2^{nd}$ chamber) of the etching container. The outlet of the siphon tube is submerged into water held in another container (the fluid level regulation container). This container has been filled with water having its surface level with that of the etchant in the etching container, as well as level with its own edge or spout that will allow excess water to spill off into a basin, which allows this container to act as a fluid level regulator. Using an eyedropper, titration column, or some other flow controlling apparatus, approximately 200 mL of deionized water is introduced into the remaining outer chamber ($3^{rd}$ chamber) of the etching container at a rate that maintains the fluid level across the three interconnected chambers, preserving the concave meniscus in the center chamber (see FIG. 2). Etchant is removed from the etching container and into the fluid level regulator chamber by siphon action, allowing it to be replaced with the water. The separation of the inflow, sample, and siphoned outflow into three separate chambers prevents excessive disturbance of the sample that could result in its damage or loss during the water wash.

The remaining thin film sample is invisible or nearly invisible to the naked eye. The etching container, with the thin film sample in the etching chamber, is transported to the Brewster's Angle Microscope (BAM). The bottom of the center (etching) chamber is designed to have a low laser reflectivity. In this example, the chamber is black in color and equipped with a 665 nm longpass filter at its floor. The BAM's laser (in this example, a 630 nm red He—Ne laser with p-polarizing filter), having previously been calibrated to the Brewster's angle of the air-water interface, is fired into the center chamber of the etching container. The etching chamber is manipulated under the laser to search for the sample floating on the water's surface using two video cameras: one directly above looking through the microscope lens and one looking down the axis of the anticipated reflection angle (see FIG. 3). The etching chamber is searched until a reflection is detected at the laser's point of entry into the water, indicating the presence of the sample.

Once the sample is located on the surface of the water in the etching container, a micromanipulator holding a probe is positioned above it. The probe, comprises:

a. a downward sloping shank, made of material that will not readily alloy or react with gallium (e.g. tungsten), with an approximately 1 mm diameter horizontal loop at the lowest end;

b. one to several turns (a plurality of coils) of small gage resistance wire wrapped around, but not touching, the shank and having power leads; and, c. a drop of gallium metal (approximately 0.25 mm$^3$ for a 1 mm loop) suspended from the shank's loop in an inverted cone shape.

The resistance wire leads are connected to a power supply (e.g., approximately 0.5V at 2 A DC), producing heat from the wire wrappings that heats the gallium drop to slightly above its melting point (approximately 30.5° Celsius)(see FIG. 4).

The liquid gallium drop is lowered onto the floating sample in the etching container via the micromanipulator controls. The sample sticks to the gallium drop due to Van der Waals forces. The sample can then easily be transported to and deposited on another substrate (in this experiment, the SiO$_2$ surface of a Si wafer) by touching the sample bearing gallium probe tip to the new substrate.

Example 2: Comparison of Wet Transfer Versus Gallium Transfer

A 1.2 mm round sample of graphene bearing copper substrate, punched from a larger piece, was transferred to the SiO$_2$ surface of an oxidized Si wafer by a previously established wet transfer method. This method involves dropping the floating sample onto the wafer after etching by positioning the wafer beneath the sample and lowering the fluid level until the graphene rests on the SiO$_2$ surface. This process does not involve touching the sample with gallium and, therefore, acts as a control sample. This control sample was then inspected using a 532 nm wavelength Raman spectrometer, with a beam width of ~35 micrometers, to establish a baseline spectrum for a graphene sample without gallium contamination.

A second 1.2 mm round sample of graphene bearing copper substrate was prepared from the same larger piece and transferred to the SiO$_2$ surface of an oxidized Si wafer using the gallium probe method described in Example 1.

This experimental sample was then inspected using a Raman spectrometer to establish a spectrum for a graphene sample after having been in contact with gallium.

The above process was repeated three times and the resulting gallium transfer spectra were compared to their respective control spectra. As shown in FIG. 5, the comparison showed no discernable difference between the sample and control spectra in the number of peaks, peak shift, peak height, or background curve that might indicate the presence of gallium contamination.

Numerous modifications and variations of the present invention are possible in light of the above teachings. It is therefore to be understood that within the scope of the appended claims, the invention may be practiced otherwise that as specifically described herein.

We claim:

1. A method of transferring a graphitic thin film, comprising:
   (a) contacting a liquid-suspended graphitic thin film with a liquid gallium probe, wherein the graphitic thin film adheres to the liquid gallium of the probe to form a gallium-suspended graphitic thin film; and,
   (b) transferring the graphitic thin film to a substrate by contacting the graphitic thin film with the substrate, wherein the graphitic thin film adheres to the substrate to form a graphitic thin film-coated substrate.

2. The method of claim 1, wherein the graphitic thin film is suspended in water.

3. The method of claim 1, wherein the substrate of step (b) is an oxidized Si wafer.

4. The method of claim 1, wherein contacting and transferring are performed with a micromanipulator.

5. The method of claim 1, wherein liquid gallium probe, comprises:
   (i) a shank with $1^{st}$ and $2^{nd}$ ends;
   (ii) a loop attached to the $1^{st}$ end of the shank;
   (iii) a drop of gallium in contact with the loop; and
   (iv) a heat source capable of liquefying gallium.

6. The method of claim 5, wherein the heat source, comprises: a coil of resistance wire surrounding, but not touching the shank and in close enough proximity to the gallium drop to liquefy it.

7. The method of claim 5, wherein the heat source, comprises: a plurality of coils of resistance wire surrounding, but not touching the shank and in close enough proximity to the gallium drop to liquefy it.

8. The method of claim 1, wherein the process, prior to step (a), further comprises:
   (a1) placing a graphitic-metal material, comprising: the graphitic thin film and a metal layer, into a $1^{st}$ chamber of an etching container, comprising:
      (i) a $1^{st}$ chamber comprising: an etchant solution, a $1^{st}$ port, and a $2^{nd}$ port, wherein the etchant level is above the level of the ports and is in contact with the metal layer of the graphitic-metal material;
      (ii) a $2^{nd}$ chamber adjacent to the $1^{st}$ chamber, comprising: the etchant solution and a $1^{st}$ port in liquid contact with the $1^{st}$ port of the $1^{st}$ chamber, wherein the etchant level is above the level of the $1^{st}$ port; and,
      (iii) a $3^{rd}$ chamber adjacent to the $1^{st}$ chamber, comprising: the etchant solution and a $1^{st}$ port in liquid contact with the $2^{nd}$ port of the $1^{st}$ chamber, wherein the etchant level is above the level of the $1^{st}$ port;
   (a2) inserting, after the etchant has dissolved the metal layer of the graphitic-metal sample, a first end of a siphon below the etchant level of the $2^{nd}$ chamber and the second end into a water-containing fluid level regulation container,
   (a3) introducing water into the $3^{rd}$ chamber at a rate and amount sufficient to replace the etchant in the $1^{st}$ chamber with water by causing;
      (i) the etchant solution to exit the $3^{rd}$ chamber and enter the $1^{st}$ chamber;
      (ii) the etchant solution to exit the $1^{st}$ chamber and enter the $2^{nd}$ chamber; and,
      (iii) the etchant solution to exit the $2^{nd}$ chamber and into the fluid level regulation container via the siphon.

9. The method of claim 8, further comprising:
   (a4) locating the resulting graphitic thin film with a Brewster's Angle Microscope.

10. The method of claim 1, wherein the process, prior to step (b), further comprises:
    (a5) heating the gallium to a temperature sufficient to liquefy it.

11. The method of claim 8, wherein the process, prior to step (b), further comprises:
    (a5) heating the gallium to a temperature sufficient to liquefy it.

12. The method of claim 9, wherein the process, prior to step (b), further comprises:
    (a5) heating the gallium to a temperature sufficient to liquefy it.

13. The method of claim 8, wherein the metal layer of step (a1) is copper.

14. The method of claim 8, wherein the etchant solution of step (a1)(i) is 1M ferric chloride.

* * * * *